Jan. 12, 1926.  
G. VANNONI  
1,569,689
SOLE MOLDING AND TRIMMING DEVICE
Filed August 1, 1925
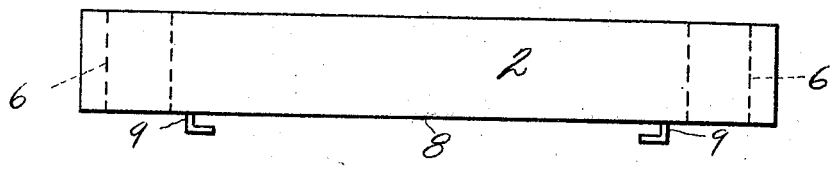
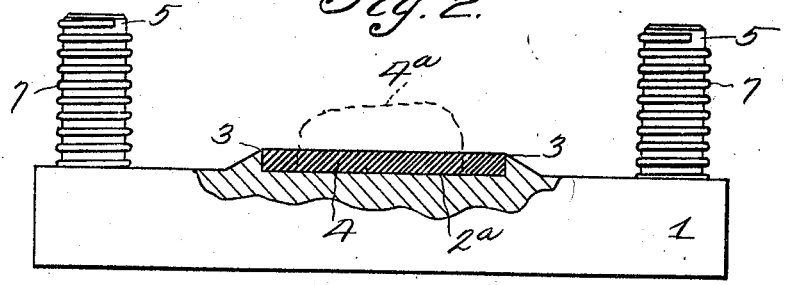
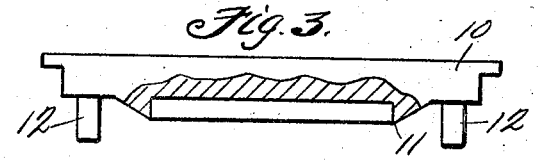
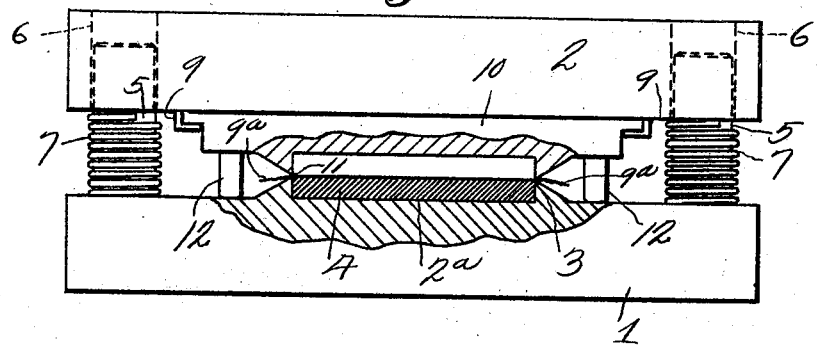
INVENTOR.  
Gino Vannoni.  
BY George J. Koch  
ATTORNEY.

Patented Jan. 12, 1926.

1,569,689

UNITED STATES PATENT OFFICE.

GINO VANNONI, OF MISHAWAKA, INDIANA.

SOLE MOLDING AND TRIMMING DEVICE.

Application filed August 1, 1925. Serial No. 47,541.

*To all whom it may concern:*

Be it known that I, GINO VANNONI, a citizen of the United States, residing at Mishawaka, in the county of St. Joseph and State of Indiana, have invented certain new and useful Improvements in Sole Molding and Trimming Devices, of which the following is a specification.

The invention relates to sole molding and trimming devices, particularly of the type for molding and trimming rubber soles and has for its object to provide a device of this character comprising a base having a cavity therein of the size and shape of the sole to be molded, and in which a piece of rubber stock is placed and pressed by a presser plate to fill the cavity for forming the sole, which is then vulcanized to maintain the same in shape. It has been found during this operation that the excess material is forced outwardly along the marginal edge of the sole between the base plate and the presser plate, and the present practice is to trim this by hand, or by a cutter in combination with the mold, however where the hand cutting is involved there is considerable labor expended, and where the mold cutter is used, the web is entirely severed by engaging cutting edges, and which edges become dull incident to their engagement. To obviate the above difficulties the under side of the presser block is provided with means for receiving and holding a cutter plate, which is removed during the pressing operation, thereby allowing the under side of the presser plate to be used for a pressing surface.

A further object is to provide a cutter plate with limiting means cooperating with the base plate for preventing the cutting edge thereof from coming entirely in engagement with the base plate cutting edge, thereby preventing dulling of the cutting edges, but at the same time severing the web to a point where it can be easily and quickly removed from the sole.

A further object is to provide the underside of the presser plate with means for holding the cutter plate with its cutting edges in registration with the cutting edges of the base plate.

With the above and other objects in view the invention resides in the combination and arrangement of parts as hereinafter set forth, shown in the drawing, described and claimed, it being understood that changes in the precise embodiment of the invention may be made within the scope of what is claimed without departing from the spirit of the invention.

In the drawing:—

Figure 1 is a side elevation of the press plate.

Figure 2 is a view in elevation of the base plate, parts being broken away to better show the structure.

Figure 3 is a view in elevation of the cutter plate partly broken away to better show the structure.

Figure 4 is a view in elevation of the mold, showing the cutter plate in position and part broken away to better show the structure.

Referring to the drawing, the numeral 1 designates the base plate and 2 the presser plate of the mold. The base plate 1 is provided with a cavity $2^a$ of the shape of the sole to be formed, and which cavity is provided with an upwardly extending marginal cutting edge 3. When it is desired to form a rubber sole 4, a piece of rubber stock $4^a$ is placed in the cavity $2^a$, and then the presser plate 2 is placed on the base 1 with the upwardly extending lugs 5 extending through the apertures 6 of the presser plate. The mold is then placed in a press and the presser plate 2 is forced downwardly into engagement with the rubber stock $4^a$ against the action of the coiled springs 7 which surround the lugs 5. The pressing operation spreads the rubber stock $4^a$ and fills the cavity $2^a$, however the excess rubber stock will be forced outwardly over the cutting edge 3 between the cutting edge and the underside 8 of the presser block, thereby forming what is known as a web $9^a$, which has to be removed. After the pressing operation the mold is placed in a vulcanizer for a vulcanizing operation. Heretofore in molds, the webs have been manually severed after the vulcanizing operation, or cutters provided in connection with the mold, however where there is a manual cutting of the web considerable labor is expended and where there is a complete severing by cutting edges, cutting edges are dulled by the engagement of the relative sharp edges with each other. To obviate the above difficulty the under side 8 of the press plate 2 is provided with angularly shaped guide and holding members 9, which receive a cutter plate 10 after the vulcanizing operation, and which plate is removed during the pressing and vulcanizing operation. The guide members 9 are positioned, whereby when the plate 10 is placed thereon, its cutting edge 11 registers with the cutting edge 3 of the base plate 1, therefore it will be seen that when pressure is applied to the presser plate 2, the cutting edges 11 and 3 will be forced towards each other for severing or partially severing the web 9ᵃ. However to prevent the cutting edges 11 and 3 from coming into engagement with each other, but at the same time allow the sides of the sole and the webs to be substantially severed without engagement of the cutting edges, the cutter plate 10 is provided with downwardly extending lugs 12, which engage the upper side of the base plate 1, and limit the downward movement of the cutter plate to a position where its cutting edge 11 will be relatively close to the cutting edge 3 without engaging the same. After the web cutting operation it is obvious the web can be easily and quickly removed from the sole without involving any material amount of labor.

From the above it will be seen that a removable cutter is provided in connection with the under side of a presser plate of a sole mold, thereby allowing the under side of the presser plate to be used for pressing stock to form in the mold, and the holding means for the removable cutter will not interfere with the pressing operation. It will also be seen that limiting means is provided in connection with the cutter plate for preventing the severing edges from engaging each other, thereby dulling and damaging the same.

The invention having been set forth what is claimed as new and useful is:—

1. The combination with a sole molding and cutting mold comprising a base plate, a presser plate, a cutting edge surrounding a stock receiving cavity carried by the base plate and with which the adjacent side of the presser plate cooperates during a sole forming operation, of cutter receiving members carried by the adjacent side of the presser plate and positioned whereby they will not interfere with the pressing operation.

2. The combination with a sole mold comprising a base plate having a stock receiving cavity, a presser plate above the base plate, the underside of the presser plate cooperating with the base plate during a sole forming operation, of cutter receiving means carried by the underside of the press plate and positioned whereby it will not interfere with the pressing operation.

3. The combination with a sole forming mold comprising a base plate, an upwardly extending cutting edge surrounding a stock receiving cavity in the base plate, a presser plate above the base plate, of cutter receiving means carried by the underside of the presser plate and positioned whereby it will not interfere with the pressing operation when the presser plate is forced downwardly towards the base plate.

4. The combination with a sole forming mold comprising a base plate, a presser plate above the base plate, a cutting edge carried by the base plate and surrounding a cavity in the base plate, of a removable cutter carried by the under side of the presser plate and cooperating with the cutting edge carried by the base plate whereby webs may be severed from a sole.

5. The combination with a sole forming and molding device comprising a base plate, a presser plate, means for guiding said plates in relation to each other, of a cutter plate carried by the under side of the presser plate and removably attached thereto, a cutting edge carried by the cutter plate and adapted to sever webs from a sole formed in the cavity in the base plate, and means carried by the cutter plate and co-operating with the base plate for limiting the downward movement of the cutter plate.

6. The combination with a sole forming mold comprising a base plate having an upwardly extending cutting edge forming a stock receiving cavity, a presser plate above the base plate and guidable in its movement towards the base plate, of a cutter plate removably mounted on the underside of the presser plate, a cutting edge carried by the cutter plate and cooperating with the cutting edge of the base plate, and means carried by the cutter plate and cooperating with the base plate for limiting the downward movement of the cutter plate, whereby the cutting edges will be prevented from coming into engagement with each other during a web cutting operation.

7. The combination with a sole forming mold comprising a base plate having an upwardly extending web cutting flange, a presser plate guidable in relation to the base plate, of a removable cutter plate carried by the underside of the presser plate, a cutter cooperating with the base plate cutting edge and carried by the cutter plate, cutter plate receiving channels carried by the underside of the presser plate and disposed at opposite sides of the cutter edge carried by the base plate, and members carried by the cutter plate and cooperating with the base plate for limiting the downward movement of the cutter plate and preventing the cutting edges from engaging each other.

In testimony whereof I affix my signature.

GINO VANNONI.